(12) United States Patent  
Fairchild

(10) Patent No.: US 9,315,149 B1  
(45) Date of Patent: Apr. 19, 2016

(54) NON-ALARMING AUDIBLE ALERTING DEVICE FOR AUTOMOBILES

(71) Applicant: Christopher Paul Fairchild, Waccabuc, NY (US)

(72) Inventor: Christopher Paul Fairchild, Waccabuc, NY (US)

(*) Notice: Subject to any disclaimer, the term of this patent is extended or adjusted under 35 U.S.C. 154(b) by 44 days.

(21) Appl. No.: 14/546,304

(22) Filed: Nov. 18, 2014

(51) Int. Cl.
*B60Q 5/00* (2006.01)
*B60R 16/02* (2006.01)
*H05K 5/00* (2006.01)

(52) U.S. Cl.
CPC . *B60Q 5/00* (2013.01); *B60R 16/02* (2013.01); *H05K 5/0026* (2013.01)

(58) Field of Classification Search
None
See application file for complete search history.

(56) References Cited

U.S. PATENT DOCUMENTS

| | | | | |
|---|---|---|---|---|
| 2002/0011928 A1* | 1/2002 | Williams | B60Q 9/006 340/436 |
| 2002/0180597 A1* | 12/2002 | Flick | B60Q 9/007 340/436 |
| 2011/0199199 A1* | 8/2011 | Perkins | B60Q 1/506 340/435 |
| 2014/0266658 A1* | 9/2014 | Feldman | B60Q 5/008 340/438 |

* cited by examiner

*Primary Examiner* — Paul Huber

(57) ABSTRACT

A non-alarming audible alerting device is an apparatus that is utilized to deliver a non-alarming audible alert to a pedestrian, bicyclist, or motorist in the vicinity of the user's vehicle. The device features a sound module and an at least one speaker that, once activated by the user, outputs an audible alert to the pedestrian, bicyclist, or motorist notifying the targeted person of the approach of the user's vehicle in a non-alarming manner. The audible alert may be customized by the user by connecting the alerting device to an external computing device through a data port found on the device. A license plate may be attached to a license plate attachment region found on the device and the device may be mounted to a vehicle by inserting fasteners through an at least one set of mounting holes aligned with existing license plate mounting holes on the vehicle.

17 Claims, 10 Drawing Sheets

NON-ALARMING AUDIBLE ALERTING DEVICE FOR AUTOMOBILES

FIELD OF THE INVENTION

The present invention relates generally to a device for generating an audio alert. More specifically, the present invention is an alerting device for alerting pedestrians, bicyclists, and motorists of the presence of an approaching vehicle.

BACKGROUND OF THE INVENTION

In modern infrastructure, it is common for pedestrians, bicyclists, and motorists to simultaneously share a single road. Due to the significant difference in sizes between motor vehicles and pedestrians/bicyclists, motor vehicles can often present a significant hazard for non-motor vehicle traffic. Much of the hazard present on the road stems from unawareness of one's surroundings. Similarly, motorists often fail to adequately ensure that pedestrians and bicyclists are aware of their presence upon approaching. It is possible to utilize a motor vehicle's horn in order to audibly notify a pedestrian or bicyclist of the motor vehicle's approach. However, conventional motor vehicle horns are designed for use in emergencies and are very loud when activated. As such, a pedestrian or bicyclist caught unaware is likely to become startled upon hearing the jarring sound generated by the motor vehicle horn. Additionally, the unexpected alarm upon hearing a motor vehicle horn is likely to cause the pedestrian or bicyclist to react in a sudden and unsafe manner. Therefore, a means of safely alerting pedestrians, bicyclists, and even other motorists of an approaching vehicle's presence is desirable. The present invention seeks to address the aforementioned issues as well as provide a practical, convenient, and safe solution.

The present invention is a non-alarming audible alerting device for automobiles that may be mounted onto a motor vehicle. The present invention is remotely activated by the user in order to generate an audible alert to a nearby pedestrian, bicyclist, or motorist, safely warning the target of the approach of the user's vehicle. The present invention generates an audible warning that is not alarming to the nearby pedestrian, bicyclist, or motorist. As such, upon hearing the warning, the pedestrian, bicyclist, or motorist is not startled and is able to safely react to the approach of the user's motor vehicle.

DETAIL DESCRIPTIONS OF THE INVENTION

All illustrations of the drawings are for the purpose of describing selected versions of the present invention and are not intended to limit the scope of the present invention.

The present invention is a non-alarming audible alerting device for automobiles that allows the user to safely alert a nearby pedestrian, bicyclist, or motorist of the approach of the user's vehicle in a non-alarming audible manner. The present invention may be mounted to the body of a vehicle such as on the region of the vehicle body on which the front license plate is normally attached. Additionally, a license plate may be mounted to the present invention when the present invention is in place on the vehicle body. In the preferred embodiment of the present invention, the present invention is designed to be mounted to the region of the vehicle body on which the front license plate is normally attached in order to direct an audible alert towards a pedestrian, bicyclist, or motorist in front of the user's vehicle. However, the present invention may be mounted onto any other region of the vehicle body as well at the user's discretion.

Figure 1:
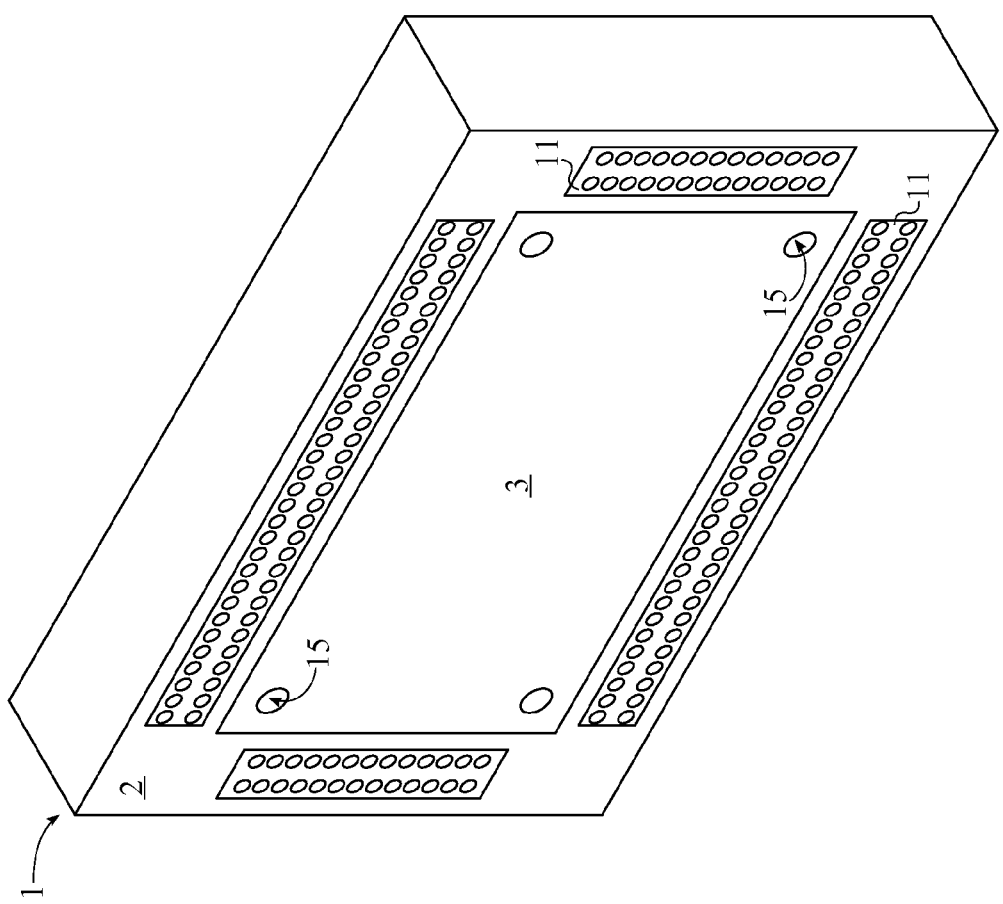
FIG. 1 is a perspective view of the present invention.
Figure 4:
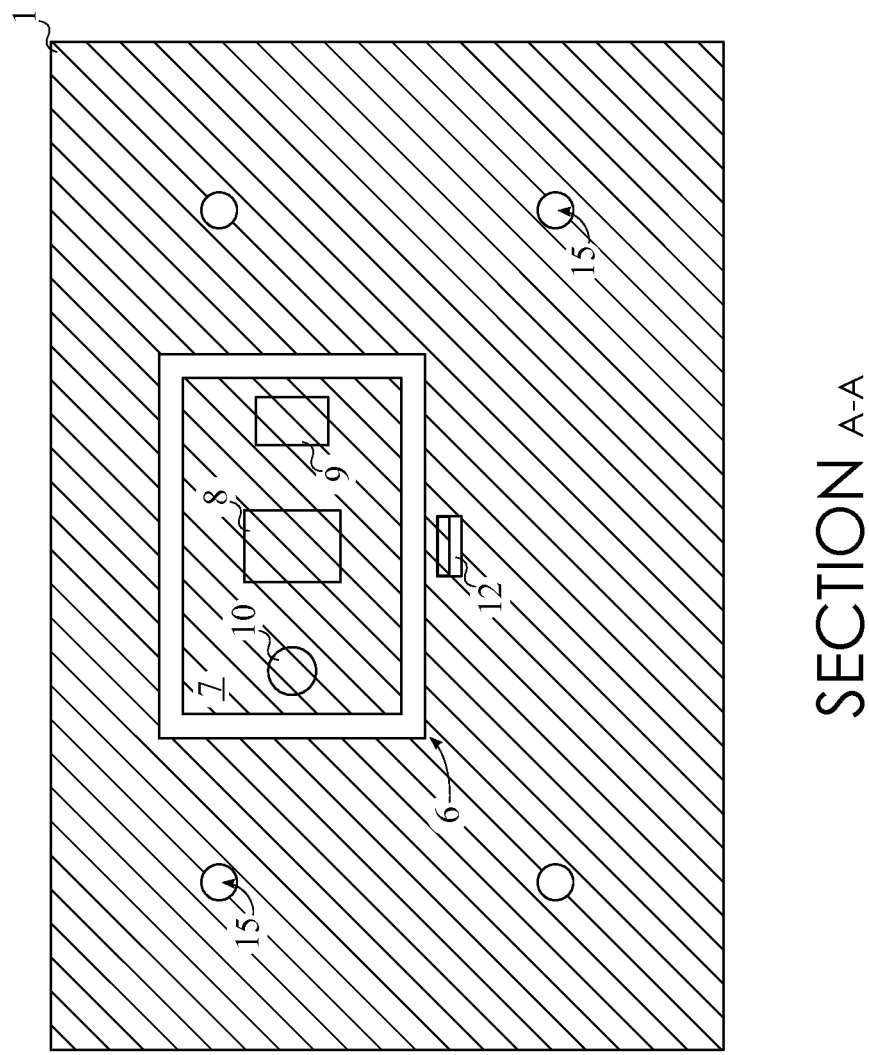
FIG. 4 is a cross-sectional view of the present invention taken along line A-A of FIG. 3.
Figure 5:
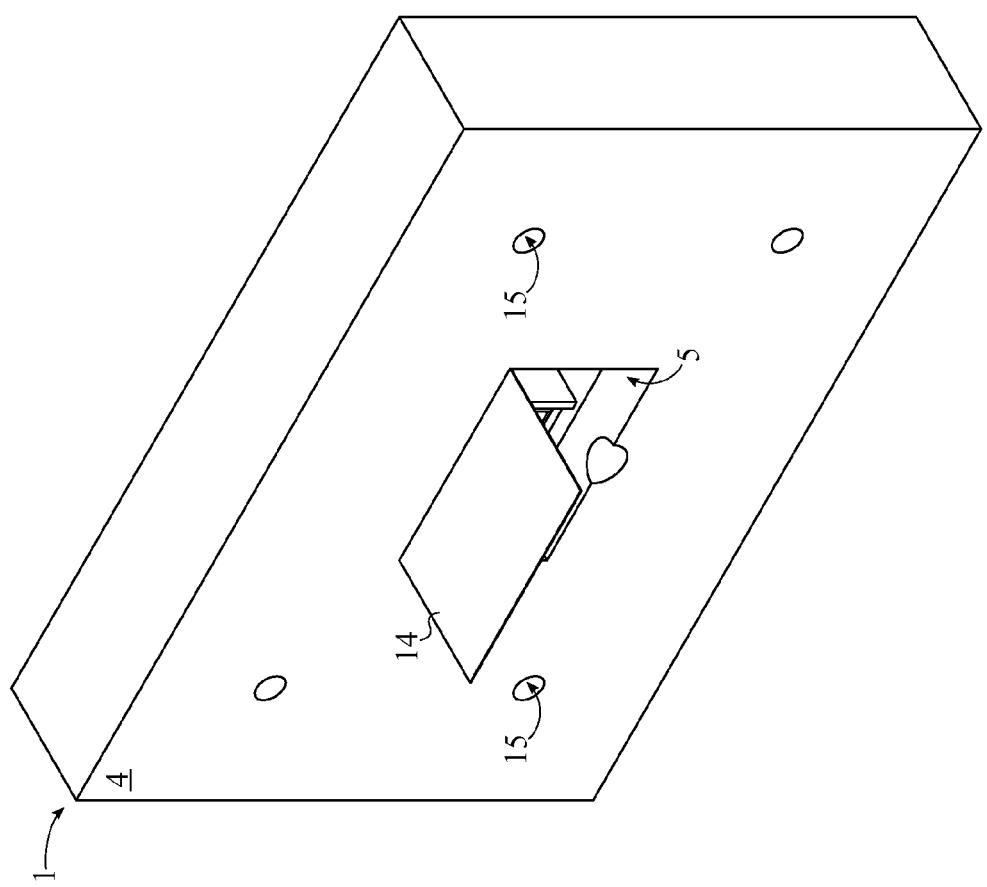
FIG. 5 is an alternate perspective view of the present invention with the power compartment uncovered.
Figure 6:
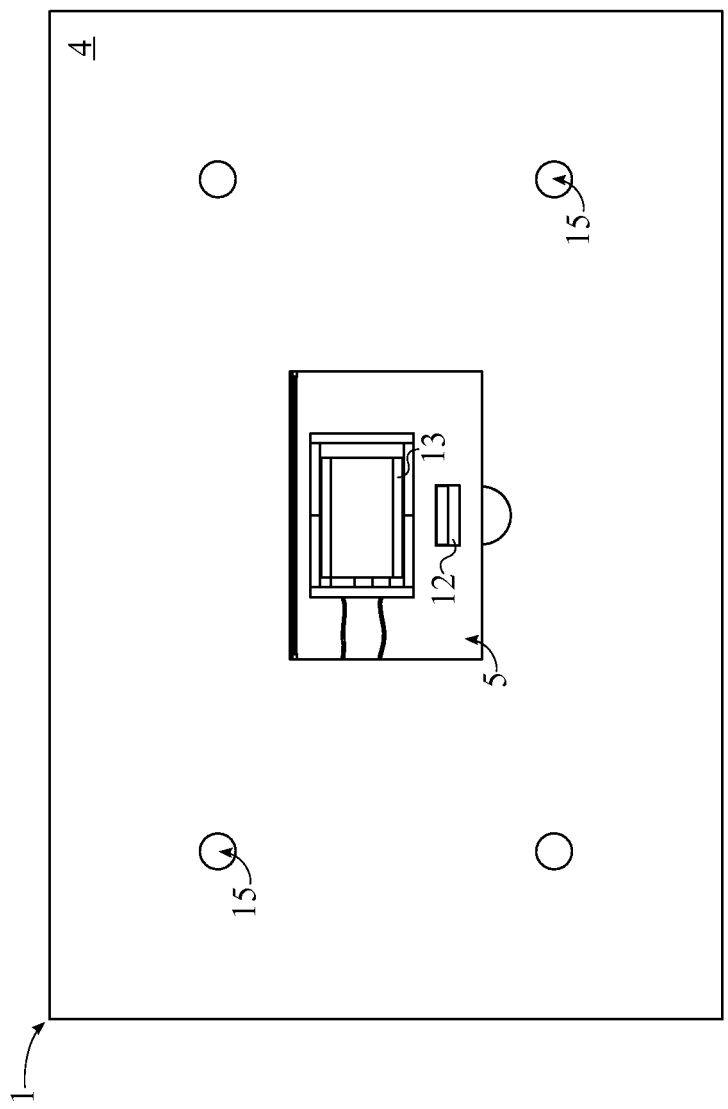
FIG. 6 is a rear view of the present invention with the power compartment uncovered.

With reference to FIGS. 1-6, the present invention comprises a housing structure 1, a power compartment 5, a sound module 6, at least one speaker 11, and a data port 12. The housing structure 1 protects the internal components of the present invention and additionally serves as a mount for a vehicle license plate. The power compartment 5 protects the data port 12 as well as a power source 13 that provides power to the electronic components of the present invention. The power compartment 5 is enclosed within the housing structure 1 in order to protect the data port 12 and the power source 13. The sound module 6 stores and initiates playback of an audio recording that serves as an audible alert directed toward a pedestrian, bicyclist, or motorist that the user wishes to warn of his or her approaching motor vehicle. The sound module 6 is enclosed within the housing structure 1 as shown in FIG. 4 in order to protect the components of the sound module 6. In the preferred embodiment of the present invention, playback is initiated upon the user remotely activating the sound module 6 (e.g. from a remote control located within the cabin of his or her vehicle). The at least one speaker 11 plays the audible alert that serves as a non-alarming warning of the approach of the user's motor vehicle. As shown in FIG. 1, the at least one speaker 11 is mounted into the housing structure 1 and is coincident with the outer surface 2 in order to allow sound output from the at least one speaker 11 to be directed outward from the vehicle when the present invention is mounted to the vehicle. The data port 12 is utilized in order to connect the present invention to an external computing device. This allows the user to customize the audible alert that is played through the at least one speaker 11. The data port 12 traverses into the power compartment 5 as shown in FIG. 6 in order to protect the data port 12 and to allow an input device such as a USB (Universal Serial Bus) cord to be electronically connected to the present invention. The data port 12 is electronically connected to a data storage device 8 through a PCB (printed circuit board) 7 as well to allow the user to transfer an audio recording to the data storage device 8.

Figure 7:
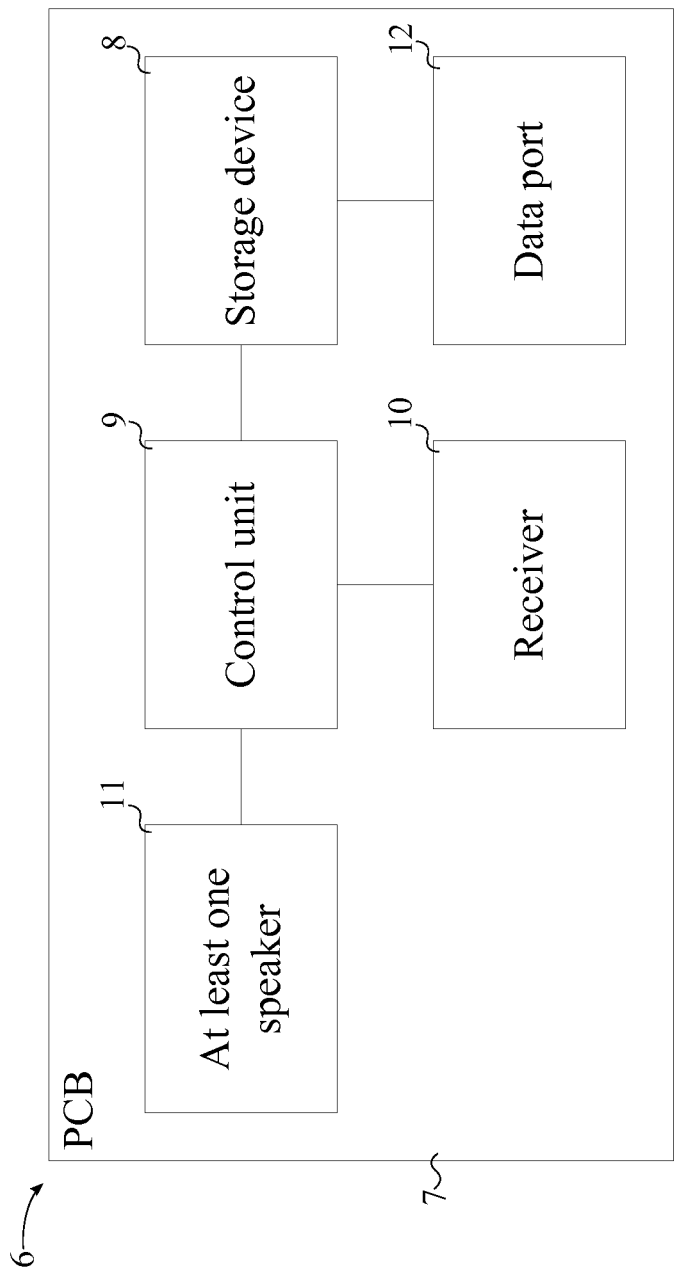
FIG. 7 is a schematic diagram of the electronics of the present invention.

The housing structure 1 comprises an outer surface 2 and an inner surface 4. When the present invention is mounted to the vehicle body, the inner surface 4 is oriented toward the vehicle body while the outer surface 2 is oriented away from the vehicle. The sound module 6 comprises the PCB 7, the data storage device 8, a control unit 9, and a receiver 10. As shown in FIG. 7, the at least one speaker 11, the data storage device 8, the control unit 9, and the receiver 10 are electronically connected to each other through the PCB 7. As such, the PCB 7 serves as the base for the electronic components of the present invention and allows the electronic components to communicate with each other. The data storage device 8 stores one or more audio recordings that serve as audible alerts to warn pedestrians, bicyclists, and other motorists of the user's vehicle's approach. The control unit 9 processes a command and initiates playback of the audible alert upon receipt of the command from the user (e.g. from a remote control). The receiver 10 receives a command from the user and relays the command to the control unit 9 in order to initiate playback of the audible alert. In the preferred embodiment of the present invention, the receiver 10 is wireless and is able to wirelessly receive user commands inputted through a remote control device located within the vehicle interior. The control unit 9 accesses a stored audio recording on the data storage device 8 and initiates audible output of the stored audio recording through the at least one speaker 11.

Figure 8:
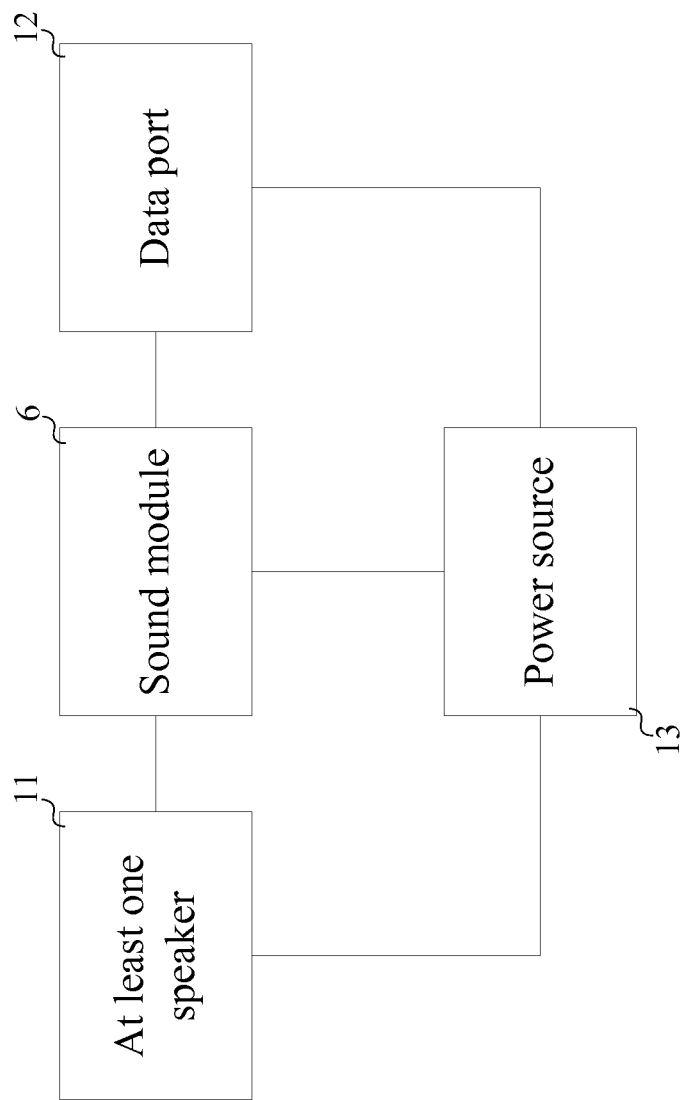
FIG. 8 is an additional schematic diagram of the electronics of the present invention.

The power source 13 of the present invention is enclosed within the power compartment 5 in order to protect the power source 13 from potential hazards such as the elements. With reference to FIG. 8, the power source 13 is electrically connected to the at least one speaker 11, the sound module 6, and the data port 12 in order to provide power to the electronic components of the present invention. The present invention is not limited with respect to the specific type of power source 13 utilized to provide power to the electronic components of the present invention. The power source 13 may be replaceable, rechargeable, or the electronic components of the present invention may draw power directly from the vehicle electrical system.

Figure 2:
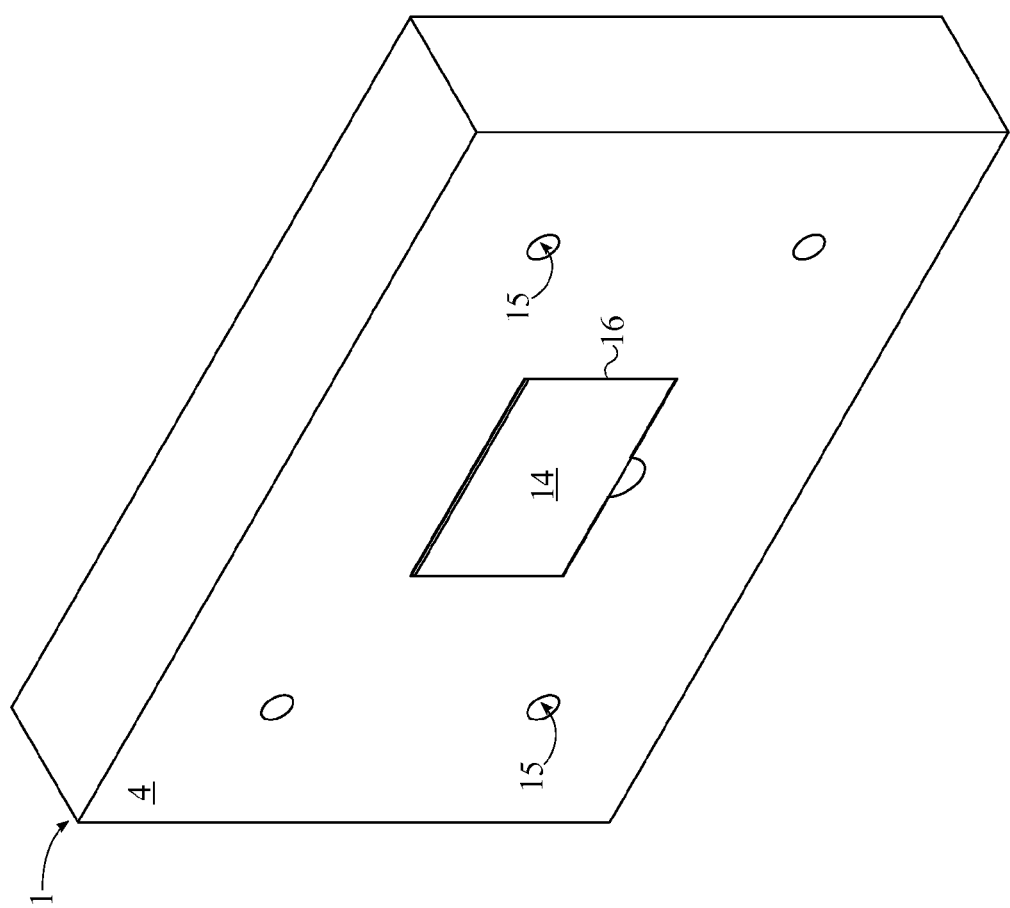
FIG. 2 is an alternate perspective view of the present invention.
Figure 3:
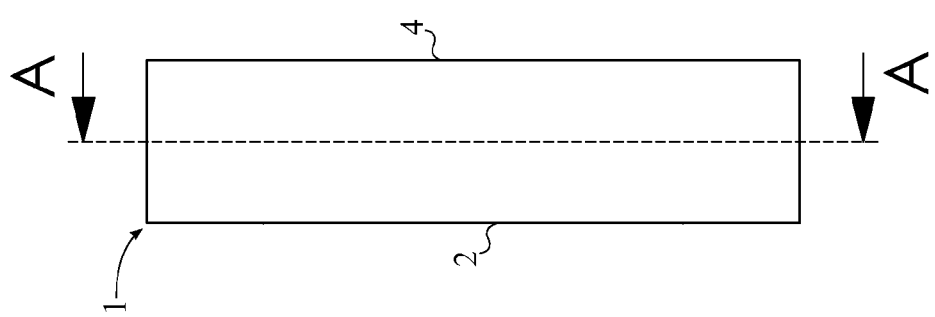
FIG. 3 is a side view of the present invention.

Because the present invention is primarily intended for use while mounted to the exterior of a vehicle, the present invention is exposed to the elements when the vehicle is outdoors. As such, the present invention further comprises an access hatch 14. With reference to FIG. 2, the access hatch 14 covers the power compartment 5 in order to protect the power source 13 and the data port 12 from the elements and any other potential hazards. As shown in FIG. 5, the access hatch 14 is able to uncover the power compartment 5, allowing user access to the power source 13 and to the data port 12 within the power compartment 5. The access hatch 14 is laterally connected to the power compartment 5, coincident with the inner surface 4, forming a seal between the exterior environment and the interior of the power compartment 5. The access hatch 14 is selectively positioned over the power compartment 5. In the preferred embodiment of the present invention, the access hatch 14 is hingedly connected to the power compartment 5. When the access hatch 14 is positioned over the power compartment 5, the access hatch 14 covers the power compartment 5. As such, the access hatch 14 is able to protect the power compartment 5 while still providing access to the power compartment 5 for the user. In an embodiment of the present invention, the access hatch 14 comprises a waterproof seal 16 enclosing the power compartment 5.

The present invention may be mounted to the exterior of a vehicle body such as on the region of the vehicle body on which the front license plate is normally attached. As such, the present invention comprises at least one set of mounting holes 15. The at least one set of mounting holes 15 traverses through the housing structure 1 and allows the user to insert fasteners such as screws through the at least one set of mounting holes 15 in order to secure the present invention to the vehicle body. The at least one set of mounting holes 15 is asymmetrically aligned to the at least one speaker 11 in order to provide sufficient spacing between the at least one set of mounting holes 15 and the at least one speaker 11 and to allow the present invention to be mounted to the region of the vehicle body on which the front license plate is normally attached. In the preferred embodiment of the present invention, the at least one set of mounting holes 15 is aligned with the mounting holes normally utilized to mount a front license plate to the vehicle.

Figure 9:
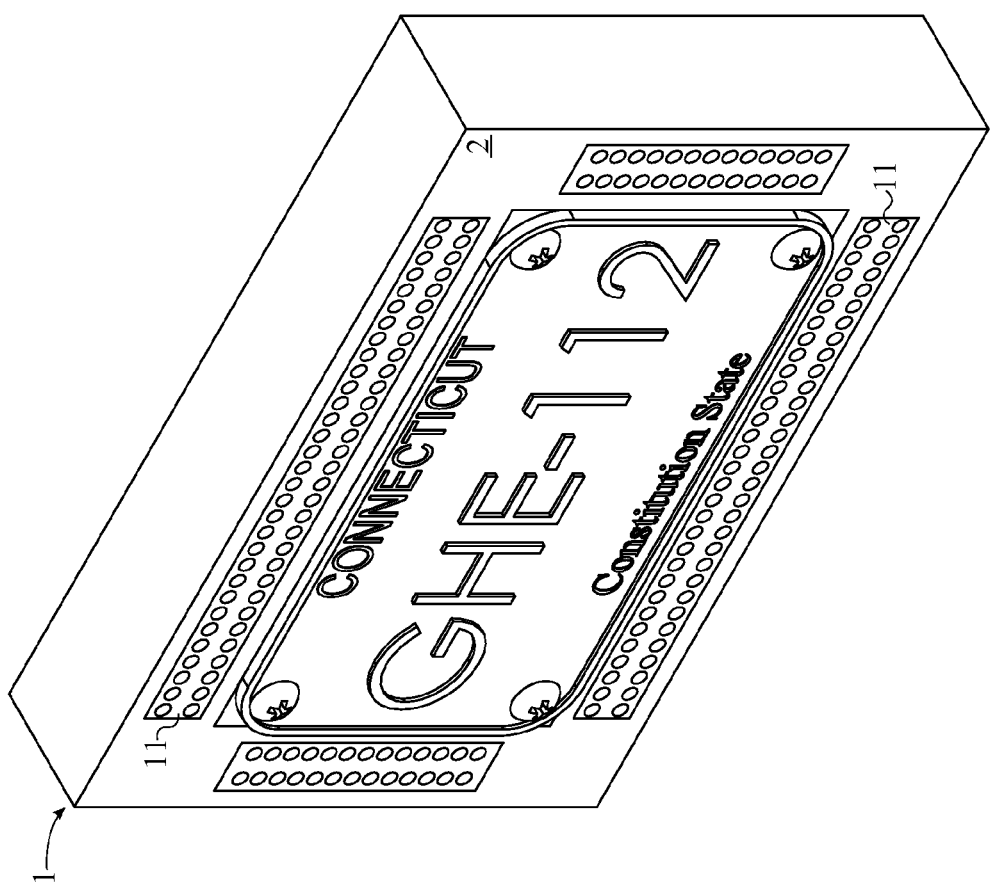
FIG. 9 is a perspective view of the present invention with an attached license plate.
Figure 10:
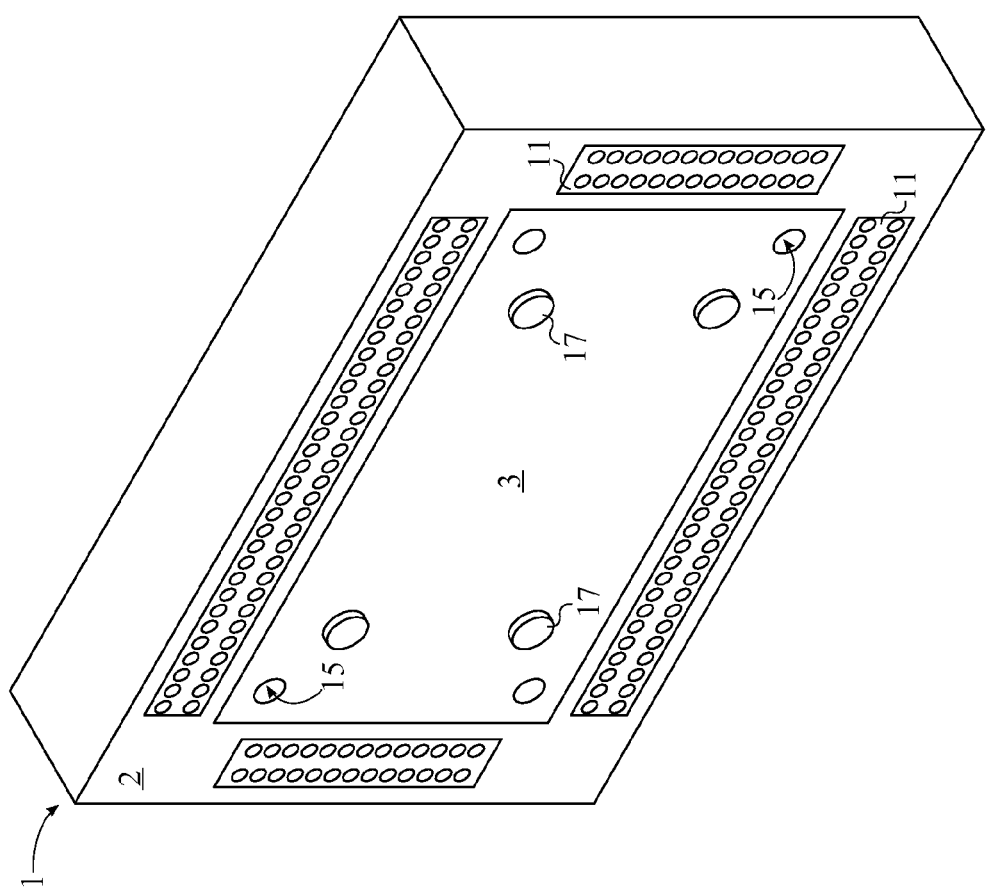
FIG. 10 is a perspective view of the present invention with a magnetic engagement for a license plate.

The outer surface 2 comprises a license plate attachment region 3. The license plate attachment region 3 allows the user to secure a (front) license plate to the outer surface 2. As shown in FIG. 9, the at least one set of mounting holes 15 may be aligned with the mounting holes already present on the vehicle. Fasteners may be inserted into the at least one set of mounting holes 15 and the existing mounting holes in order to secure the license plate to the license plate attachment region 3. In an embodiment of the present invention, the license plate attachment region 3 comprises a magnetic engagement 17 for securing a license plate as shown in FIG. 10. The magnetic engagement 17 of the license plate attachment region 3 provides additional security for a mounted license plate in addition to the security provided by the fasteners. The license plate attachment region 3 is centrally positioned on the outer surface 2 in order to place the license plate in an aesthetically pleasing and central position on the present invention. In the preferred embodiment of the present invention, the at least one speaker 11 is perimetrically positioned about the outer surface 2. This prevents an attached license plate from blocking the at least one speaker 11 and any audio output through the at least one speaker 11 as well.

The objective of the present invention is to provide the user with a means of warning a pedestrian, bicyclist, or motorist in the vicinity of the user's vehicle in a non-alarming manner in order to alert the targeted person of the user's vehicle's presence. The present invention provides an alternative means of alerting the targeted person that is safer than utilizing a vehicle horn with a sudden and jarring report. The audible alert output by the at least one speaker 11 is customizable through the data port 12. As such, a variety of non-alarming audio recordings may be uploaded to the data storage device 8 and utilized as audible alerts. Example audible alerts include, but are not limited to, various non-threatening noises such as a doorbell chime, a bicycle bell chime, and a bird's chirp. Upon being notified of the user's vehicle's presence in a safe manner, the pedestrian, bicyclist, or motorist is able to take appropriate actions to avoid the user's vehicle.

Although the present invention has been explained in relation to its preferred embodiment, it is understood that many other possible modifications and variations can be made without departing from the spirit and scope of the present invention as hereinafter claimed.

What is claimed is:

1. A non-alarming audible alerting device for automobiles comprises:
   a housing structure;
   a power compartment;
   a sound module;
   at least one speaker;
   a data port;
   the housing structure comprises an outer surface and an inner surface;
   the sound module comprises a printed circuit board (PCB), a data storage device, a control unit, and a receiver;
   the power compartment being enclosed within the housing structure;
   the sound module being enclosed within the housing structure;

the at least one speaker, the data storage device, the control unit, and the receiver being electronically connected to each other through the PCB;

the at least one speaker being mounted into the housing structure;

the at least one speaker being coincident with the outer surface;

the data port traversing into the power compartment; and the data port being electronically connected to the data storage device through the PCB.

2. The non-alarming audible alerting device for automobiles as claimed in claim 1 further comprises:

a power source;

the power source being enclosed within the power compartment; and the power source being electrically connected to the at least one speaker, the sound module, and the data port.

3. The non-alarming audible alerting device for automobiles as claimed in claim 1 further comprises:

an access hatch;

the access hatch being laterally connected to the power compartment, coincident with the inner surface; and the access hatch being selectively positioned over the power compartment, wherein the access hatch covers the power compartment.

4. The non-alarming audible alerting device for automobiles as claimed in claim 1 further comprises:

at least one set of mounting holes;

the at least one set of mounting holes traversing through the housing structure; and the at least one set of mounting holes being asymmetrically aligned to the at least one speaker.

5. The non-alarming audible alerting device for automobiles as claimed in claim 1 further comprises:

the outer surface comprises a license plate attachment region; and the license plate attachment region being centrally positioned on the outer surface.

6. The non-alarming audible alerting device for automobiles as claimed in claim 1 further comprises:

the at least one speaker being perimetrically positioned about the outer surface.

7. The non-alarming audible alerting device for automobiles as claimed in claim 1, wherein the access hatch comprises a waterproof seal enclosing the power compartment.

8. The non-alarming audible alerting device for automobiles as claimed in claim 1, wherein the license plate attachment region comprises a magnetic engagement for securing a license plate.

9. A non-alarming audible alerting device for automobiles comprises:

a housing structure;

a power compartment;

a sound module;

at least one speaker;

a data port;

a power source;

the housing structure comprises an outer surface and an inner surface;

the sound module comprises a printed circuit board (PCB), a data storage device, a control unit, and a receiver;

the outer surface comprises a license plate attachment region;

the power compartment being enclosed within the housing structure;

the sound module being enclosed within the housing structure;

the at least one speaker, the data storage device, the control unit, and the receiver being electronically connected to each other through the PCB;

the at least one speaker being mounted into the housing structure;

the at least one speaker being coincident with the outer surface;

the data port traversing into the power compartment;

the data port being electronically connected to the data storage device through the PCB;

the at least one speaker being perimetrically positioned about the outer surface;

the power source being enclosed within the power compartment;

the power source being electrically connected to the at least one speaker, the sound module, and the data port; and the license plate attachment region being centrally positioned on the outer surface.

10. The non-alarming audible alerting device for automobiles as claimed in claim 9 further comprises:

an access hatch;

the access hatch being laterally connected to the power compartment, coincident with the inner surface; and the access hatch being selectively positioned over the power compartment, wherein the access hatch covers the power compartment.

11. The non-alarming audible alerting device for automobiles as claimed in claim 9 further comprises:

at least one set of mounting holes;

the at least one set of mounting holes traversing through the housing structure; and the at least one set of mounting holes being asymmetrically aligned to the at least one speaker.

12. The non-alarming audible alerting device for automobiles as claimed in claim 9, wherein the access hatch comprises a waterproof seal enclosing the power compartment.

13. The non-alarming audible alerting device for automobiles as claimed in claim 9, wherein the license plate attachment region comprises a magnetic engagement for securing a license plate.

14. A non-alarming audible alerting device for automobiles comprises:

a housing structure;

a power compartment;

a sound module;

at least one speaker;

a data port;

a power source;

at least one set of mounting holes;

the housing structure comprises an outer surface and an inner surface;

the sound module comprises a printed circuit board (PCB), a data storage device, a control unit, and a receiver;

the outer surface comprises a license plate attachment region;

the power compartment being enclosed within the housing structure;

the sound module being enclosed within the housing structure;

the at least one speaker, the data storage device, the control unit, and the receiver being electronically connected to each other through the PCB;

the at least one speaker being mounted into the housing structure;

the at least one speaker being coincident with the outer surface;

the data port traversing into the power compartment;

the data port being electronically connected to the data storage device through the PCB;

the at least one speaker being perimetrically positioned about the outer surface;

the power source being enclosed within the power compartment;

the power source being electrically connected to the at least one speaker, the sound module, and the data port;

the license plate attachment region being centrally positioned on the outer surface;

the at least one set of mounting holes traversing through the housing structure; and the at least one set of mounting holes being asymmetrically aligned to the at least one speaker.

15. The non-alarming audible alerting device for automobiles as claimed in claim 14 further comprises:

an access hatch;

the access hatch being laterally connected to the power compartment, coincident with the inner surface; and the access hatch being selectively positioned over the power compartment, wherein the access hatch covers the power compartment.

16. The non-alarming audible alerting device for automobiles as claimed in claim 14, wherein the access hatch comprises a waterproof seal enclosing the power compartment.

17. The non-alarming audible alerting device for automobiles as claimed in claim 14, wherein the license plate attachment region comprises a magnetic engagement for securing a license plate.

\* \* \* \* \*